United States Patent [19]
Gilbert

[11] Patent Number: 6,058,433
[45] Date of Patent: *May 2, 2000

[54] SYSTEM AND METHOD FOR PROVIDING INCREASED THROUGHPUT THROUGH A COMPUTER SERIAL PORT TO A MODEM COMMUNICATIONS PORT

[75] Inventor: Timothy G. Gilbert, Vermillion, S. Dak.

[73] Assignee: Gateway 2000, Inc., North Sioux City, S. Dak.

[*] Notice: This patent issued on a continued prosecution application filed under 37 CFR 1.53(d), and is subject to the twenty year patent term provisions of 35 U.S.C. 154(a)(2).

[21] Appl. No.: 08/685,437

[22] Filed: Jul. 23, 1996

[51] Int. Cl.[7] ............................... H04M 11/00; H04J 3/12
[52] U.S. Cl. .......................... 709/250; 375/260; 370/466; 370/465; 370/468; 370/463
[58] Field of Search ................................. 395/200.8, 892, 395/309, 891; 370/420, 465, 473, 466, 474, 537, 540; 375/222, 260, 377

[56] References Cited

U.S. PATENT DOCUMENTS

| | | | |
|---|---|---|---|
| 4,254,462 | 3/1981 | Raymond et al. | 395/892 |
| 4,630,286 | 12/1986 | Betts | 375/260 |
| 4,723,237 | 2/1988 | Andrew et al. | 370/204 |
| 4,748,656 | 5/1988 | Gibbs et al. | 395/309 |
| 4,783,137 | 11/1988 | Kosman et al. | 385/53 |
| 4,802,220 | 1/1989 | Marker, Jr. | 380/33 |
| 4,958,342 | 9/1990 | Williams et al. | 370/79 |
| 4,996,685 | 2/1991 | Farese et al. | 370/352 |
| 5,193,149 | 3/1993 | Awiszio et al. | |
| 5,218,677 | 6/1993 | Bono et al. | 395/872 |
| 5,285,199 | 2/1994 | Pocek | 370/474 |
| 5,305,312 | 4/1994 | Fornek et al. | 370/264 |
| 5,390,239 | 2/1995 | Morris et al. | 375/260 |
| 5,394,438 | 2/1995 | Takai | 375/286 |
| 5,404,491 | 4/1995 | Huzenlaub et al. | 395/500 |
| 5,444,703 | 8/1995 | Gagliardi et al. | 370/60.1 |
| 5,450,412 | 9/1995 | Takebayashi et al. | 395/309 |
| 5,483,530 | 1/1996 | Davis et al. | 370/465 |
| 5,504,742 | 4/1996 | Kakuma et al. | 370/420 |
| 5,546,549 | 8/1996 | Barrett et al. | 395/309 |
| 5,598,536 | 1/1997 | Slaughter, III et al. | 395/200.49 |
| 5,604,870 | 2/1997 | Moss et al. | 395/200.8 |
| 5,666,362 | 9/1997 | Chen et al. | 370/420 |
| 5,699,532 | 12/1997 | Barrett et al. | 395/200.8 |
| 5,708,663 | 1/1998 | Wright et al. | 370/524 |
| 5,717,870 | 2/1998 | Dobson | 395/200.8 |
| 5,739,777 | 4/1998 | Kaneko | 370/466 |
| 5,745,702 | 4/1998 | Morozumi | 395/200.79 |
| 5,809,070 | 9/1998 | Krishnan et al. | 395/309 |

*Primary Examiner*—Zarni Maung
*Assistant Examiner*—William Thomson
*Attorney, Agent, or Firm*—Schwegman, Lundberg, Woessner & Kluth P.A.

[57] ABSTRACT

An external modem providing for the increased throughput of a serial device of a computer by de-multiplexing data over a pair of physical serial channels of the computer in a predetermined manner is disclosed. A communications port allows for communicatively coupling the computer to an external communications system, such as ISDN. A driver de-multiplexes data received from the logical serial device for transmission over the pair of physical serial channels. A controller then receives the data from the pair of serial channels for transmission over an existing communications system. Communication throughput from the computer to the existing communications system therefore exceeds the maximum throughput of a particular serial channel. The controller also is capable of receiving data from the external communications system for transmission over the pair of serial channels, the driver also capable of multiplexing the data received from the pair of serial channels for transmission over the logical serial device.

7 Claims, 2 Drawing Sheets

SYSTEM AND METHOD FOR PROVIDING INCREASED THROUGHPUT THROUGH A COMPUTER SERIAL PORT TO A MODEM COMMUNICATIONS PORT

FIELD OF THE INVENTION

This invention relates generally to increasing throughput of a logical serial device of a computer, and more particularly to such increased throughput via de-multiplexing data over a pair of physical serial channels of the computer in a predetermined manner.

BACKGROUND OF THE INVENTION

Frequently a user of a computer may wish to attach an external modem or other communications device to the computer, so that the user can access the Internet, or an online service such as America Online or CompuServe. To attach the external modem, the user typically plugs the modem into an open serial port on the back of the computer. The user then sets up software on the computer to access the modem. This software will typically utilize a logical serial device over which all communication with the modem takes place.

The logical serial device typically corresponds to only one physical serial channel, or port. For example, in a typical PC-compatible computer, such as a Gateway 2000 personal computer, the logical serial device may be named COM1 or COM2, and correspond to a single physical serial port on the back of the computer. Each physical serial port is usually controlled by a Universal Asynchronous Receiver Transmitter, or UART, which is a chip device within the computer. Typical UARTs include the 16450 and 16550A. The 16450 and 16550A generally allow for communication over the serial port at a maximum throughput of 115,200 bits per second (bps).

Prior to the advent of high-speed communications systems such as Integrated Digital Service Network (ISDN), this maximum throughput did not act as a practical limitation of communication speed. State-of-the-art modems using the V.34 standard are generally limited to 28,800 bps. In addition, the plain old telephone systems (POTS) to which these modems connect are frequently not robust enough to allow even 28,8000 bps throughput. Therefore, use of 16450 and 16550A UARTs within PC-compatible computers became widespread as a cost-effective serial port controller which did not practically limit communication speed.

However, with the advent of ISDN, much higher speeds exceeding that of the maximum allowed by the 16450 and 16550A UARTs are possible, and increasingly commonplace. In a typical ISDN installation, a user has access to data transfer over one or two Basic Rate Interface (BRI) B channels, each allowing 64,000 bps throughput. Although a 16450 or 16550A UART will accommodate the maximum 64,000 bps throughput when only one B channel is utilized, the maximum 128,000 bps throughput achieved by using two B channels exceeds the 115,200 bps limit allowed by the UARTs. A user tying two B channels to a single serial port loses 12,800 bps of throughput—or more throughput than the maximum allowed by modems which were state of the art only one decade ago.

Previous solutions in the prior art enabling a logical serial device to exceed the 115,200 bps barrier have focused on replacing the UART with a faster chip. One solution is the Universal Serial Bus (USB), which allows for serial port communications at a speed of approximately 12,000,000 bps. However, these efforts to replace the UART and its particular architecture are slow going. Much of the software in existence depends on a specific kind of UART; replacing the UART with newer technology such as a USB entails rewriting software or replacing hardware, which are always difficult propositions.

There is a need, therefore, for allowing a logical serial device within a computer to exceed the 115,200 bps throughput limit inherent in tying a logical serial device to a single physical serial port controlled by a UART. There is also a need for providing that any increase in throughput over 115,200 bps comes at a minimal cost of incompatibility with existing software and hardware.

SUMMARY OF THE INVENTION

This invention relates to increased throughput of a serial device of a computer via de-multiplexing data over a pair of physical serial channels of the computer in a predetermined manner. A computer system comprises a computer and an external modem operatively coupled to one another via a pair of serial cables coupling a pair of serial ports of the modem to a corresponding pair of serial ports of the computer. The computer comprises a driver. The driver de-multiplexes data received from the logical serial device for transmission over the pair of physical serial channels of the computer, to a corresponding pair of physical serial channels of the modem.

The external modem comprises a controller. In one embodiment, the modem couples to a line of an external communications system having one data channel, such that the modem multiplexes the data received over the physical serial channels and sends it over the line. In another embodiment, the line has two data channels, such that the modem does not multiplex the data received over the physical serial channels. Instead, the modem sends the de-multiplexed data stream from one of the serial channels over one of the data channels, and sends the stream from the other serial channel over the other data channel.

In this manner, communication throughput from the computer to the existing communications system exceeds the maximum of a particular serial channel. By splitting the data stream over two separate physical serial channels, the invention overcomes the maximum throughput limitation of using just one serial channel. In fact, the present invention allows a theoretical maximum throughput of twice the speed of each individual serial channel. With a typical UART having 115,200 bps maximum throughput, therefore, the maximum throughput under the invention would be 230,400 bps.

The present invention is also compatible with existing software that assumes a single logical serial device, such as COM1. The present invention allows for software to send data over the single logical serial device, which is then de-multiplexed over the pair of serial channels. From the software's standpoint, however, the data is being transmitted over a single logical serial device. The de-multiplexing and subsequent multiplexing is transparent to the software.

In a further embodiment of the invention, the controller of the modem also receives data from the external communications system line. If the line has two data channels, then the controller passes along the data from one of the data channels to one of the serial channels, and the data from the other of the data channels to the other of the serial channels. If the line has only one data channel, then the controller de-multiplexes the data over the two serial channels, in the predetermined manner. In either case, the data next travels from the serial channels of the modem to the serial channels of the computer. The driver of the computer then multiplexes the data for transmission over the logical serial device. In this manner, the present invention allows for data to be received from the existing communications system, in addition to allowing for data to be sent by the computer over the existing communications system.

Other and further embodiments, aspects and advantages of the present invention will become apparent in the following description and by reference to the accompanying drawings.

DETAILED DESCRIPTION OF THE DRAWINGS

Figure 1:
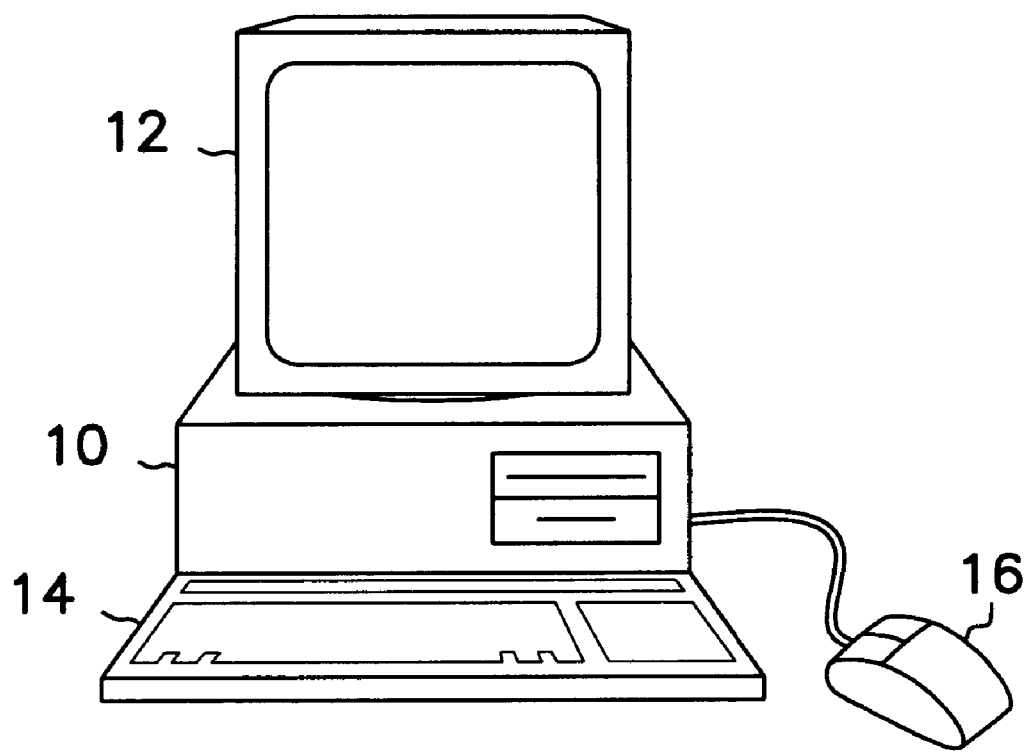
FIG. 1 is a diagram of a computer in which the present invention is capable of implementation; and, FIG. 2 is a block diagram of a computer and an external modem under the present invention.

The present invention effects increased throughput of a logical serial device of a computer, by de-multiplexing data over a pair of physical serial channels of the computer in a predetermined manner. The present invention is not limited as to the type of computer to which it is applied. Any computer having a pair of physical serial channels is amenable to having the throughput of a logical serial device thereof increased. However, a typical example of such a computer is shown in FIG. 1. Computer 10 may be of any type, for example, a Gateway 2000 personal computer. Computer 10 usually has connected to it monitor 12, keyboard 14, and input device 16, which as shown in FIG. 1 is a mouse. Not shown is that computer 10 typically also comprises a random-access memory (RAM), a read-only memory (ROM), a central-processing unit (CPU), a fixed storage device such as a hard disk drive, and a removable storage device such as a floppy disk drive.

Figure 2:
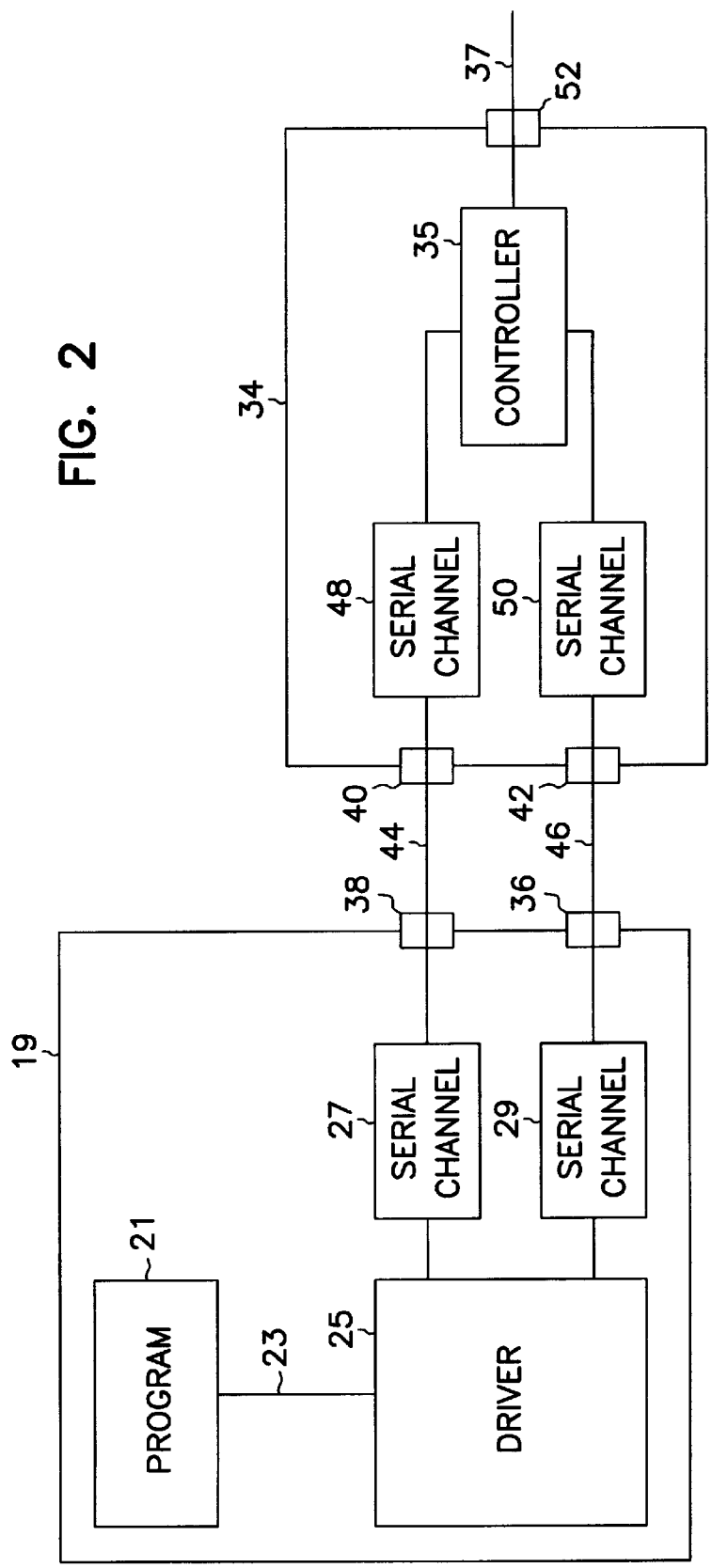

Referring now to FIG. 2, a block diagram of an embodiment of the present invention is shown. Computer 19 includes program 21, logical serial device 23, driver 25, and serial channels 27 and 29. As already discussed, computer 19 can be of any number of different types of computer. Program 21 is software utilizing logical serial device 23, and is not part of the present invention. While the computer is on, the software usually resides in RAM, and is executed by the CPU of the computer. Program 21 can be one of any type of program that may require use of a logical serial device. For example, it can be the communications software for an online service such as America Online or CompuServe. Alternatively, program 21 can be software to allow access to the Internet, such as Netscape Navigator. Still alternatively, program 21 can be a general-purpose terminal emulation program, emulating, for example, a VT-100 terminal.

Program 21 sends and receives data over logical serial device 23. As those skilled in the art readily understand, logical serial device 23 is a software implementation. The hardware configuration underlying the software implementation can be changed without affecting implementation of the logical serial device insofar as program 21 is concerned. For example, on a computer running Microsoft Windows 95 or Windows 3.11, logical serial device 23 is what is known in the at as a "comm port," and is specifically numbered as COM1, COM2, etc. Program 21 is typically configured to send and receive data from this comm port. Thus, the underlying hardware implementation of logical serial device 23 is transparent to program 21.

Data sent by program 21 onto logical serial device 23 is received by driver 25. In one embodiment, driver 25 is software stored within the RAM of computer 19 and executed on the CPU of computer 19; in another embodiment, driver 25 is hardware or a combination of hardware and software residing within computer 19. Driver 25 de-multiplexes in a predetermined manner the data received form program 21 sent on logical serial device 23 into two data streams, one stream for transmission over physical serial channel 27 and another for transmission over physical serial channel 29. The present invention is not limited to any particular predetermined manner in which driver 25 multiplexes the data. One typical protocol is Point-to-Point (PPP) Multilink Protocol (MP), as those skilled in the art readily understand. Such a protocol is designed to take data on one incoming stream, and split it up into two or more outgoing streams for later reassembly into one stream. The manner in which a protocol divides the data into two streams, and later reassembles into one stream, is particular to the protocol used, and is not part of the present invention; any protocol using any manner of division and later reassembly can be used without departing from the spirit or scope of the invention.

Driver 25 sends the multiplexed data over physical serial channel 27 and physical serial channel 29. Each of physical serial channels 27 and 29 is a separate hardware implemented serial channel, and therefore differs from logical serial device 23, which is a creation of software and not dependent on any particular hardware implementation. The present invention is not limited to any particular physical serial channel. However, in one embodiment of the invention each of physical serial channels 27 and 29 is a Universal Asynchronous Receiver-Transmitter (UART) controlled channel. As those skilled in the art understand, a UART is an interface chip, required for communication over a serial connection to serial devices. In one particular embodiment of the invention, the UART is a 16550A integrated circuit (IC) produced by National Semiconductor. In another embodiment, it is a 16450 integrated circuit available from many vendors. Each of the 16450 and 16550A UARTs is limited to a data throughput of 115,200 bits per second (bps).

Serial channels 27 and 29 have associated serial ports 36 and 38, which can be any of a number of different types of serial ports. In one embodiment, serial ports 36 and 38 are DB-9 ports having nine pins each. In another embodiment, they are DB-25 ports having twenty-five pins each. Serial ports 36 and 38 allow external modems and other devices to couple to serial channels 27 and 29.

External modem 34 is a modem capable of coupling to an existing communications system. The present invention is not limited as to the type of modem to which it is applied. Any type of modem having a pair of physical serial channels and which is capable of coupling to an existing communications system is within the spirit and scope of the invention. As shown in FIG. 2, external modem 34 couples to existing communications system line 37 via port 52. The present invention is not limited to the type of existing communications system line 37 is a part of.

In one embodiment, line 37 is an Integrated Services Digital Network (ISDN) line, as those skilled in the art readily understand. In this embodiment, line 37 is a Basic Rate Interface (BRI) ISDN line, having one or two data channels (or B channels), and optionally a control channel (or D channel). Each B channels is typically capable of 64,000 bps each, although in some implementations of ISDN they are limited to 56,000 bps each. Each B channel is typically a logical channel, and does not necessarily correspond to separate physical cables or wires. Line 37 in another embodiment is a plain-old telephone system (POTS)

line, as ordinarily found in most homes across the United States today. Furthermore, in one embodiment port 52 is an RJ-45 jack to receive a line ending in an RJ-45 connector, whereas in another embodiment it is an RJ-11 jack to receive a line ending in an RJ-11 connector. However, the present invention is not limited to any particular connector used as port 52.

External modem 34 also has serial ports 40 and 42, to enable external modem 34 to couple computer 19 at serial ports 38 and 36 via serial cables 44 and 46, as those skilled in the art will readily understand. Serial ports 40 and 42 can be any of a number of different types of serial ports, and the invention is not limited to any particular type. In one embodiment, serial ports 40 and 42 are DB-9 serial ports having nine pins each, whereas in another embodiment the serial ports are DB-25 serial ports having twenty-five pins each.

Controller 35 receives data sent by driver 25 of computer 19 over serial channels 27 and 29 and transmitted to corresponding physical serial channels 48 and 50. Controller 35 is hardware residing within external modem 34. Each of serial channels 48 and 50 is a separate hardware implemented serial channel. The present invention is not limited to any particular physical serial channel. In one embodiment of the invention each is a Universal Asynchronous Receiver-Transmitter (UART) controlled channel. In one particular embodiment, the UART is a 16550A integrated circuit. In another embodiment, it is a 16450 integrated circuit. As has been explained, each of these UARTs is limited to a data throughput of 115,200 bits per second (bps). Furthermore, physical serial channels 48 and 50 must be compatible with physical serial channels 29 and 29 of computer 19. In one embodiment, physical serial channels 48 and 50 match physical serial channels 27 and 29, in that all four are of the same type.

In one embodiment of the invention, controller 35 multiplexes the de-multiplexed data received through serial channels 48 and 50, and sends the multiplexed data over a single logical data channel within line 37 coupled to external modem 34 via port 52. For example, in the case where line 37 is a POTS line, there is only one logical data channel therein. Therefore, controller 35 multiplexes the data received over the serial channels, and then sends this data over the single logical data channel within line 37. For further example, in the case where line 37 is an ISDN line only having a single B channel, there is also only a single data channel. Thus, controller 35 in this instance also multiplexes the data received over the serial channels, and then sends the data over the single logical data channel. Controller 35 multiplexes the data in a corresponding manner in which it was de-multiplexed by driver 25. In one embodiment, driver 25 de-multiplexes data under the Multilink PPP protocol, and controller 35 multiplexes data under the same protocol. As those skilled in the art understand, though, the present invention is not limited to any particular manner to first multiplex and then de-multiplex the data.

In another embodiment of the invention, however, controller 35 does not multiplex the data received through serial channels 48 and 50. For example, in the case where line 37 is an ISDN line having two B channels, each B channel is a logical data channel. In this situation, controller 35 receives the data from serial channel 48 and sends it over one of the B channels, and receives the data from the serial channel 50 and sends it over the other B channel. Again, however, this particular embodiment of the invention is not solely limited to line 37 being an ISDN having two B channels. Any existing communications system of which line 37 is a part that has two data channels is amenable for the embodiment of the present invention in which controller 36 does not multiplex the data received through serial channels 48 and 50.

As described in conjunction with FIG. 2, the present invention allows for several advantages. In the embodiment where line 37 is compatible with ISDN and has a total throughput of 128,000 bps (i.e., it has two B channels), and serial channels 27, 29, 48 and 50 are UARTs each having a throughput of 115,200 bps, the present invention allows for communications at the maximum throughput of 128,000 bps, instead of being limited to the throughput of one of the UARTs, or 115,200 bps. This is accomplished by de-multiplexing the data the pair of serial channels of the computer for receipt by the pair of serial channels of the modem. If only one of the serial channels of the computer were used, and the modem only had one serial channel, the throughput would be limited to 115,200 bps, and the maximum rate that line 37 is capable of—128,000 bps—would not be achieved. The present invention effectively splits the throughput of line 37, such that 64,000 bps of the throughput goes through one serial channel, and 64,000 bps goes through the other serial channel.

As those skilled in the art will readily appreciate, the present invention allows for line 37 to have a maximum throughput of twice that of the serial channels. If each serial channel caries the maximum throughput of data it can handle, then the invention can support an existing communication system having twice that maxim, since there are two serial channels. Thus, in the embodiment where each of the serial channels has a throughput of 115,200 bps, the present invention can support line 37 having a maximum throughput of 230,400 bps.

The present invention as discussed in conjunction with FIG. 2 also provides for the advantage of compatibility with existing software. Program 21 sends data over logical serial device 23. That the data is multiplexed over serial channels 27 and 29 by driver 25 and sent through serial channels 48 and 50 for receipt by controller 35 is transparent to program 21. From program 21's standpoint, the data is being transmitted over a single logical serial device. Program 21, therefore, does not have to be rewritten to accommodate the increase in throughput provided by the present invention via de-multiplexing.

The embodiment of FIG. 2 also has the advantage of being compatible with existing computers, and allows for portability. External modem 34 connects to line 37, and to computer 19 via serial cables 44 and 46 coupling serial ports 38 and 36 of the computer with serial ports 40 and 42 of the modem. In the embodiment in which driver 25 is implemented within the RAM of a computer, the invention can be utilized on any computer without changing the hardware therein, but instead by just loading driver 25 into the RAM. In this way, too, the invention can be utilized on a different computer by easily disconnecting external modem 34 from computer 19 and connecting it to another computer having compatible serial ports, and loading driver 25 into the RAM of new computer. To transport the software from one computer to another, any type of computer-readable storage device can be used, and the invention is not limited as to one specific type. In one embodiment, the storage device is a floppy disk. In another embodiment, the storage device is a server connected to the Internet to which both computer 19 and the new computer have access. In yet another embodiment, the storage device is a Syquest tape cartridge.

As discussed in conjunction with FIG. 2, one embodiment of the invention allows for data to be sent by program 21 to logical serial device 22, which is de-multiplexed by driver 25 over physical serial channels 27 and 29, received by controller 35 over serial channels 48 and 50, and then sent as de-multiplexed or multiplexed data over line 37. In other words, data is sent by program 21 to external communications line 37. However, in another embodiment of the invention, data is sent from existing communications line 37 to program 21. That is, controller 35 either receives de-multiplexed data from line 37 (in the case where line 37 has two logical data channels), or receives data from line 37 which it then de-multiplexes (in the case where line 37 has only one logical data channel). Controller 35 sends this data over serial channels 48 and 50, and driver 25 receives the data through serial channels 27 and 29. Driver 25 multiplexes the data and sends it over logical serial device 23 for receipt by program 21. In this embodiment as well, those skilled in the art will understand that the present invention is not limited to any particular manner or protocol of multiplexing or de-multiplexing.

Those of ordinary skill in the art will readily appreciate that many changes and modifications to the above drawings and description can be made without departure from the spirit or scope of the following claims. For example, the invention has been shown to utilize a Multilink PPP protocol to allow for de-multiplexing and multiplexing of data. However, the invention could utilize other protocols without departing from the scope of the following claims.

I claim:

1. A system comprising:

a computer comprising:

a pair of computer serial ports, each computer serial port having a first predetermined throughput;

a driver to demultiplex first data for transmission over the pair of computer serial ports in a predetermined manner; and, a modem comprising:

a pair of modem serial ports, each modem serial port having the first predetermined throughput and coupled to a corresponding computer serial port;

a communications port having a second predetermined throughput greater than the first predetermined throughput and less then twice the first predetermined throughput; and, a controller to multiplex the first data received from the pair of computer serial ports through the pair of modem serial ports in a corresponding predetermined manner for transmission over the communications port.

2. The system of claim 1, wherein the controller is capable of demultiplexing second data received from the communications port for transmission over the pair of modem serial ports in the predetermined manner, and the driver is capable of multiplexing the second data received from the pair of modem serial ports through the pair of computer serial ports in the corresponding predetermined manner.

3. The system of claim 1, wherein the first predetermined throughput is 115,200 bits per second (bps).

4. The system of claim 1, wherein the second predetermined throughput is 128,000 bits per second (bps).

5. A method comprising:

demultiplexing first data for transmission over a first pair of computer serial ports in a predetermined manner, each computer serial port having a first predetermined throughput;

multiplexing the first data received from the first pair of computer serial ports through a second pair of modem serial ports in a corresponding predetermined manner for transmission over a communications port having a second predetermined throughput greater than the first predetermined throughput and less than twice the first predetermined throughput;

demultiplexing second data received from the communications port for transmission over the second pair of modem serial ports in the predetermined manner; and, multiplexing the second data received from the second pair of modem serial ports through the first pair of computer serial ports in the corresponding predetermined manner.

6. The method of claim 5, wherein the first predetermined throughput is 115,200 bits per second (bps).

7. The method of claim 5, wherein the second predetermined throughput is 128,000 bits per second (bps).

* * * * *